(12) United States Patent
Miura

(10) Patent No.: US 9,593,938 B2
(45) Date of Patent: Mar. 14, 2017

(54) LAYER THICKNESS MEASUREMENT METHOD

(71) Applicant: TOYOTA JIDOSHA KABUSHIKI KAISHA, Toyota-shi, Aichi-ken (JP)

(72) Inventor: Masanori Miura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/148,607

(22) Filed: May 6, 2016

(65) Prior Publication Data
US 2016/0334204 A1    Nov. 17, 2016

(30) Foreign Application Priority Data

May 13, 2015    (JP) ................................. 2015-098052

(51) Int. Cl.
*G01B 11/06*    (2006.01)

(52) U.S. Cl.
CPC ................... *G01B 11/06* (2013.01)

(58) Field of Classification Search
CPC ........ G01B 21/08; G01B 11/02; G01B 11/06; G01B 11/22; G01B 11/0683; H01L 21/67253
USPC ................................................. 356/630–632
See application file for complete search history.

(56) References Cited

U.S. PATENT DOCUMENTS

| | | | | |
|---|---|---|---|---|
| 4,762,414 A | * | 8/1988 | Grego ................. | G01N 21/211 356/485 |
| 5,289,266 A | * | 2/1994 | Shih .................... | G01B 11/0616 356/504 |
| 6,950,196 B2 | * | 9/2005 | Fielden ................ | G01N 21/211 257/E21.53 |
| 6,999,180 B1 | * | 2/2006 | Janik .................. | G01B 11/2441 356/497 |
| 2003/0076497 A1 | * | 4/2003 | Wolf .................. | G01B 11/0666 356/369 |
| 2003/0087024 A1 | * | 5/2003 | Flanagan ............... | B05D 3/065 427/2.24 |
| 2007/0084837 A1 | * | 4/2007 | Kosmowski ........... | B23K 26/04 219/121.68 |
| 2008/0158572 A1 | * | 7/2008 | Hughes .............. | G01B 11/0625 356/631 |

FOREIGN PATENT DOCUMENTS

| | | |
|---|---|---|
| JP | 2000-012522 A | 1/2000 |
| JP | 2001-194117 A | 7/2001 |
| JP | 2004-020203 A | 1/2004 |
| JP | 2012-156456 A | 8/2012 |

* cited by examiner

*Primary Examiner* — Hoa Pham
(74) *Attorney, Agent, or Firm* — Sughrue Mion, PLLC

(57) ABSTRACT

Provided is a fifth step for obtaining a removal depth of a second electrode mixture layer (first opaque layer) corresponding to an integrated value from the integrated value of the value corresponding to the number of applying pulses integrated thus far, based on a correlation between the value corresponding to the number of applying pulses of pulse laser and the removal depth of the second electrode mixture layer grasped in advance, once it is determined that a white light applying target has changed from the second electrode mixture layer to a solid electrolyte layer (second opaque layer) and acquiring the removal depth as a thickness of the second electrode mixture layer.

7 Claims, 9 Drawing Sheets

LAYER THICKNESS MEASUREMENT METHOD

INCORPORATION BY REFERENCE

The disclosure of Japanese Patent Application No. 2015-098052 filed on May 13, 2015 including the specification, drawings and abstract is incorporated herein by reference in its entirety.

BACKGROUND OF THE INVENTION

1. Field of the Invention

The invention relates to a method for measuring the thickness of an opaque layer that constitutes an opaque laminated body in which a plurality of the opaque layers are laminated.

2. Description of Related Art

Grasping of the thickness of a layer that constitutes a multilayer body in which a plurality of the layers are stacked has been required. In this regard, a method for measuring the thickness of an opaque layer (opaque film) that constitutes the multilayer body is disclosed in, for example, Japanese Patent Application Publication No. 2001-194117 (JP 2001-194117 A). Specifically, etching is performed on the opaque film and a concave portion that penetrates the opaque film in a thickness direction is formed first during the measurement of the thickness of the opaque film regarding the multilayer body in which a wafer, a release layer, an insulating layer, and the opaque layer (opaque film) are stacked in this order. Then, transparent layers (transparent films) are formed in the concave portion and on the opaque film. Subsequently, the transparent layer formed on the opaque layer is removed, and then only the concave portion is in a state of being filled with the transparent layer. Then, light is applied to the transparent layer with which the concave portion is filled, and the thickness of the opaque layer that is adjacent to the transparent layer is measured based on the reflected light from the transparent layer.

According to the above-described measurement method disclosed in JP 2001-194117 A, however, the concave portion that penetrates the opaque layer needs to be formed and the transparent layer needs to be formed in the concave portion for the opaque layer thickness measurement, and much time is taken for the opaque layer thickness measurement. Accordingly, there has been a demand for a method by which the thickness of the opaque layer can be measured within a short period of time with regard to an opaque laminated body in which a plurality of the opaque layers are stacked.

SUMMARY OF THE INVENTION

The invention provides a layer thickness measurement method for an opaque laminated body by which the thickness of an opaque layer can be measured within a short period of time with regard to an opaque laminated body in which a plurality of the opaque layers are laminated.

According to an aspect of the invention, there is provided a layer thickness measurement method for measuring a thickness of an opaque layer in an opaque laminated body in which a plurality of the opaque layers are laminated, the opaque laminated body having a first opaque layer and a second opaque layer different in color from the first opaque layer and the second opaque layer being laminated in contact with the first opaque layer, the measurement method including (1) a first step for applying white light to a portion of the first opaque layer to be removed across an entire thickness of the first opaque layer in a thickness direction of the first opaque layer from a side opposite to a side with which the second opaque layer is in contact, (2) a second step for applying pulse laser to the portion to be removed in the thickness direction of the first opaque layer from the side opposite to the side with which the second opaque layer is in contact for the portion to be removed from the first opaque layer to be removed and initiating integration of a value corresponding to the number of applying pulses of the pulse laser, (3) a third step for initiating acquisition of reflected light of the white light and performing of a spectral analysis for the reflected light, (4) a fourth step for determining whether or not a white light applying target has changed from the first opaque layer to the second opaque layer based on a result of the spectral analysis, and (5) a fifth step for obtaining a removal depth of the first opaque layer corresponding to an integrated value from the integrated value of the value corresponding to the number of applying pulses integrated, based on a correlation between the value corresponding to the number of applying pulses of the pulse laser and the removal depth of the first opaque layer grasped in advance, once it is determined in the fourth step that the white light applying target has changed from the first opaque layer to the second opaque layer and acquiring the removal depth as the thickness of the first opaque layer as a fifth processing.

By the measurement method described above, the thickness of the first opaque layer can be grasped in a period of time that is substantially equal to a period of time which is required for the removal (ablation) of the portion to be removed from the first opaque layer by applying of the pulse laser (removal time+calculation processing time). Accordingly, it can be said that the measurement method described above is a method by which the thickness of an opaque layer can be measured within a short period of time.

In the above-described layer thickness measurement method for an opaque laminated body, the opaque laminated body may be an opaque laminated body in which n units of the opaque layers are laminated, the opaque layers adjacent to each other in a laminating direction may be different colors, the measurement method may further include a step for measuring a total thickness (overall thickness) of the opaque laminated body, the processing of the first to fifth steps may be performed on the two opaque layers constituting each opaque layer set regarded as the first opaque layer and the second opaque layer in each of the (n−1) unit(s) of the opaque layer set(s), the opaque layer set being a combination of the two opaque layers adjacent to each other in the laminating direction in the opaque laminated body, such that the thickness of each of the (n−1) unit(s) of the opaque layer(s) regarded as the first opaque layer is acquired, and then a difference value may be calculated by subtracting a sum of the acquired thicknesses of the (n−1) unit(s) of the opaque layer(s) from the measured total thickness of the opaque laminated body, and the difference value may be acquired as the thickness of the remaining opaque layer, the thickness of the remaining opaque layer is not acquired during processing of the first to fifth steps described above.

According to the measurement method described above, the respective thicknesses of all the opaque layers that constitute the opaque laminated body can be grasped.

In any of the above-described layer thickness measurement methods for an opaque laminated body, the opaque laminated body may be a laminated battery material having a current collector (metallic collector layer) that is the opaque layer, a first electrode mixture layer that is the opaque layer laminated on a surface of the current collector, a solid electrolyte layer that is the opaque layer laminated on a surface of the first electrode mixture layer, and a second electrode mixture layer that is the opaque layer laminated on a surface of the solid electrolyte layer, the current collector may be different in color from the first electrode mixture layer, the first electrode mixture layer may be different in color from the solid electrolyte layer, and the solid electrolyte layer may be different in color from the second electrode mixture layer, the measurement method may include the step for measuring the total thickness of the opaque laminated body, a thickness of the second electrode mixture layer may be acquired by the processing of the first to fifth steps being performed on the second electrode mixture layer regarded as the first opaque layer and the solid electrolyte layer regarded as the second opaque layer, a thickness of the current collector may be acquired by the processing of the first to fifth steps being performed on the current collector regarded as the first opaque layer and the first electrode mixture layer regarded as the second opaque layer, a thickness of the first electrode mixture layer may be acquired by the processing of the first to fifth steps being performed on the first electrode mixture layer regarded as the first opaque layer and the solid electrolyte layer regarded as the second opaque layer, and then a difference value may be calculated by subtracting a sum of the acquired thickness of the second electrode mixture layer, the acquired thickness of the current collector, and the acquired thickness of the first electrode mixture layer from the measured total thickness of the opaque laminated body, and the difference value may be acquired as the thickness of the solid electrolyte layer.

In any of the layer thickness measurement methods for an opaque laminated body described above, the thickness of the second electrode mixture layer may be measured, then the opaque laminated body may be turned upside down and then the thicknesses of the current collector and the first electrode mixture layer may be measured.

In any of the layer thickness measurement methods for an opaque laminated body described above, the number of applying pulses of the pulse laser may be integrated during a period of measurement, and the layer thickness may be calculated by a relation expression of the number of applying pulses and the removal depth grasped in advance.

In any of the layer thickness measurement methods for an opaque laminated body described above, an integrated value of applying time corresponding to the number of applying pulses of the pulse laser may be calculated during a period of measurement, and the layer thickness may be calculated by a relation expression of the integrated value of the applying time and the removal depth grasped in advance.

In any of the layer thickness measurement methods for an opaque laminated body described above, time elapsed since initiation of applying of the pulse laser may be measured during a period of measurement, and the layer thickness may be calculated by a relation expression of the time elapsed since the initiation of the applying and the removal depth grasped in advance.

In the measurement method described above, the thicknesses of all the layers including the solid electrolyte layer can be measured with no through-hole attributable to a partial removal (ablation) of the solid electrolyte layer resulting from applying of the pulse laser being made in the solid electrolyte layer. Accordingly, electrical insulation between the first electrode mixture layer and the second electrode mixture layer is ensured even after the opaque layer thickness measurement and the laminated battery material (opaque laminated body) can be used for a battery, without being discarded, as a laminated battery material. Accordingly, it can be said that the measurement method described above is an excellent measurement method as a method for measuring the layer thickness of a laminated battery material that is an opaque laminated body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
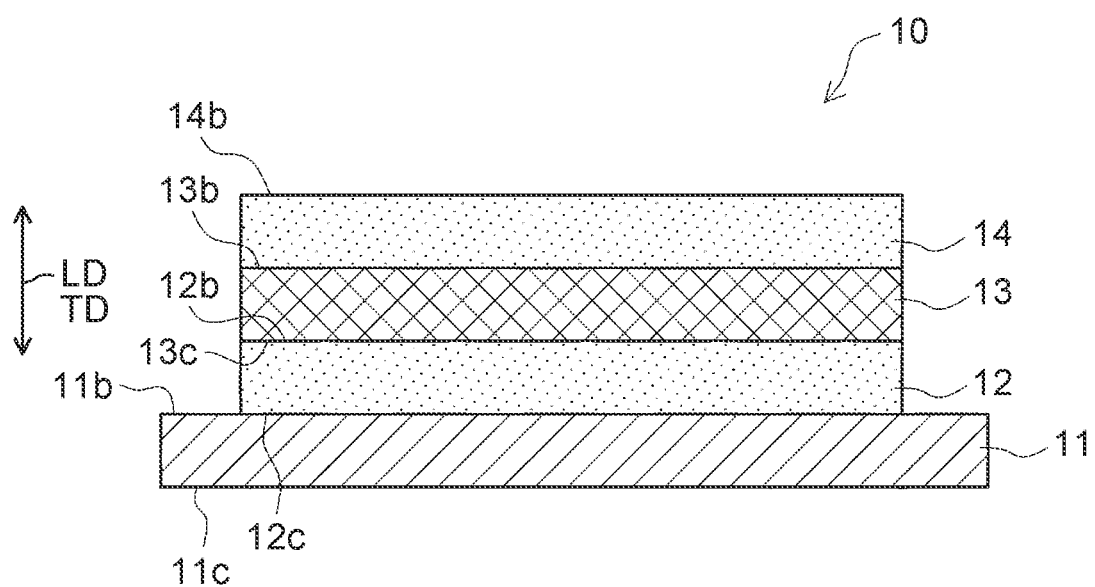
FIG. 1 is a sectional view in which an opaque laminated body (laminated battery material) is cut in a thickness direction.

According to a layer thickness measurement method for an opaque laminated body of the invention, the thickness of a first opaque layer can be measured by the processing of the above-described first to fifth steps being performed. Specifically, by the processing of the first step and the second step being performed, pulse laser (pulse laser light) can be applied to a portion of the first opaque layer to be removed in a thickness direction of the first opaque layer from the side opposite to a side with which a second opaque layer is in contact and white light can be applied to a region that is exposed with at least a part of the portion to be removed being removed from the side opposite to the side with which the second opaque layer is in contact (that is, the same side as the side from which the pulse laser is emitted) while the portion to be removed is gradually removed (ablated) in the thickness direction (sublimated in the thickness direction). In addition, a value corresponding (equivalent) to the number of applying pulses of the pulse laser can be integrated during a period in which the removal of the portion to be removed is performed by the pulse laser applying.

The "value corresponding (equivalent) to the number of applying pulses" of the pulse laser is a value that changes in accordance with the number of applying pulses, examples of which can include an integrated value of applying time (pulse width) and time elapsed since initiation of the applying as well as the number of applying pulses.

By the processing of the third step being performed, reflected light of the white light applied to the opaque laminated body can be acquired and a spectral analysis can be performed on the reflected light during the period in which the removal of the portion to be removed is performed by the pulse laser applying as described above. For example, a reflection spectrum by certain period of time (intensity distribution data regarding each wavelength component of the reflected light) can be acquired by the reflected light being acquired and the spectral analysis for the reflected light being performed at regular time intervals set in advance.

Then, in the fourth step, it is determined whether or not the white light applying target has changed from the first opaque layer to the second opaque layer based on the result of the spectral analysis. Specifically, "acquiring the reflected light and performing the spectral analysis for the reflected light at predetermined time intervals set in advance and determining whether or not a maximum value of the light intensity (intensity value of the wavelength component with the maximum light intensity among the light intensities of the respective wavelength components of the reflected light, which corresponds to a peak value of a curve representing the intensity distribution) in the reflection spectrum obtained through each spectral analysis (intensity distribution of each wavelength component of the reflected light) has reached a threshold set in advance" is performed as an example of "determining whether or not the white light applying target has changed from the first opaque layer to the second opaque layer based on the result of the spectral analysis".

Herein, to "reach the threshold" means "becoming a value equal to or higher than the threshold" in a case where the maximum value of the initial light intensity after the initiation of the spectral analysis is a value lower than the threshold and means "becoming a value equal to or lower than the threshold" in a case where the maximum value of the initial light intensity after the initiation of the spectral analysis is a value higher than the threshold.

The threshold is a threshold for determining that the target to which the white light is applied has changed from the first opaque layer to the second opaque layer. The first opaque layer and the second opaque layer are different in color from each other, and thus have different reflected light intensities even in the event of applying corresponding to the equivalent white light. Accordingly, when the target to which the white light is applied changes from the first opaque layer to the second opaque layer, the reflected light intensity changes as well. The above-described threshold is set, by the use of this property, to a value at which it can be determined that the white light applying target has changed from the first opaque layer to the second opaque layer.

In the case of the example described above, the maximum value of the light intensity (corresponding to the peak value of the curve representing the intensity distribution) in the reflection spectrum (result of the spectral analysis for the reflected light) at a time when the white light is applied to the first opaque layer and the maximum value of the light intensity (corresponding to the peak value of the curve representing the intensity distribution) in the reflection spectrum at a time when the white light is applied to the second opaque layer may be measured and a value between the two maximum light intensity values (such as a median value) may be set as the threshold in advance. Then, it can be determined in the fourth step that the target to which the white light is applied (that is, the target to which the pulse laser is applied) changes from the first opaque layer to the second opaque layer when the maximum value of the light intensity in the reflection spectrum is determined to reach the threshold (become the value equal to or higher than the threshold). At this time, it can be determined that the second opaque layer is exposed with the portion to be removed from the first opaque layer removed.

As "determining whether or not the white light applying target has changed from the first opaque layer to the second opaque layer", "determining whether or not the light intensity of a specific wavelength component in the reflection spectrum obtained through the spectral analysis (intensity distribution of each wavelength component of the reflected light) has reached a threshold set in advance" may be performed as well. Alternatively, "determining whether or not the light intensity of every wavelength component in the reflection spectrum obtained through the spectral analysis has reached a threshold set in advance" may be performed.

Then, by the processing of the fifth step being performed, the thickness of the first opaque layer can be acquired immediately after the removal of the portion of the first opaque layer to be removed by the pulse laser applying. Specifically, an integrated value of the value corresponding to the number of applying pulses integrated thus far (until a determination that the reflected light intensity has reached the threshold after the initiation of the integration of the value corresponding to the number of applying pulses of the pulse laser in the second step) is used so that a removal depth of the first opaque layer corresponding to the integrated value is obtained by the use of a previously-grasped "correlation between the value corresponding to the number of applying pulses of the pulse laser and the removal depth of the first opaque layer" and then the removal depth can be acquired as the thickness of the first opaque layer.

The "correlation between the value corresponding to the number of applying pulses of the pulse laser and the removal depth of the first opaque layer" can be previously grasped in, for example, the following manner. Specifically, a first opaque layer for testing purposes is prepared, pulse laser is applied to this first opaque layer (pulse laser equivalent to the pulse laser used for the measurement method described above) in a thickness direction of this first opaque layer, and this first opaque layer is removed (ablated) in the thickness direction. For example, the removal depth of a sample layer (depth of a concave portion formed in the sample layer by a part of the sample layer being removed) can be measured for each pulse laser applying at a predetermined pulse (predetermined number of times), and the "correlation between the number of applying pulses of the pulse laser (number of times) and the removal depth of the first opaque layer (in the form of, for example, a relational expression or a correlation data map showing the correlation between the number of applying pulses and the removal depth)" can be obtained.

By the layer thickness measurement method for an opaque laminated body according to the invention, the thickness of each opaque layer may be grasped with regard to the opaque laminated body in which n units (layers) of the opaque layers are laminated. Specifically, by the processing of the first to fifth steps being performed on the two opaque layers constituting each of (n−1) set(s) of the opaque layer set(s), which is a combination of the two opaque layers adjacent to each other in a laminating direction in the opaque laminated body, regarded as the first opaque layer and the second opaque layer, the thickness of each of the (n−1) unit(s) of the opaque layer(s) regarded as the first opaque layer can be acquired.

Herein, a case where the opaque laminated body is an opaque laminated body in which an A opaque layer, a B opaque layer, and a C opaque layer are laminated in this order in the thickness direction (n=3) will be more specifically described as an example. In this opaque laminated body, a total of two sets ((n−1) sets) of the opaque layer sets are present as the opaque layer sets (combinations of the two opaque layers that are adjacent to each other in the laminating direction), one being the set of the A opaque layer and the B opaque layer and the other being the set of the B opaque layer and the C opaque layer. Accordingly, the processing of the first to fifth steps is performed on the two opaque layers constituting each of the two opaque layer sets regarded as the first opaque layer and the second opaque layer.

Specifically, for example, the processing of the first to fifth steps is performed on the set of the A opaque layer and the B opaque layer first with the A opaque layer regarded as the first opaque layer and the B opaque layer regarded as the second opaque layer. Then, a thickness Ta of the A opaque layer that is the first opaque layer can be acquired. Subsequently, the processing of the first to fifth steps is performed on the set of the B opaque layer and the C opaque layer with the B opaque layer regarded as the first opaque layer and the C opaque layer regarded as the second opaque layer. Then, a thickness Tb of the B opaque layer that is the first opaque layer can be acquired.

In addition, a total thickness Tt of the opaque laminated body is measured by a known method (by the use of, for example, a contact-type thickness measuring instrument). This measurement may be performed before the processing of the first to fifth steps with respect to any one of the opaque layer sets or may be performed after the processing of the first to fifth steps with respect to any one of the opaque layer sets.

Then, a difference value (=Tt−(Ta+Tb)) that is obtained by subtracting the sum (=Ta+Tb) of the acquired thickness Ta of the A opaque layer and the acquired thickness Tb of the B opaque layer from the measured total thickness Tt of the opaque laminated body is calculated, and this difference value is acquired as the thickness of the C opaque layer (corresponding to the remaining opaque layer the thickness of which is not acquired during the processing of the first to fifth steps). In this manner, the thickness of each of all the opaque layers that constitute the opaque laminated body can be grasped.

Furthermore, by the layer thickness measurement method for an opaque laminated body according to the invention, the thickness of each opaque layer may be grasped with regard to an opaque laminated body (laminated battery material) in which a current collector (metallic collector layer), a first electrode mixture layer, a solid electrolyte layer, and a second electrode mixture layer (each of these being an opaque layer) are laminated in this order. Specifically, the processing of the first to fifth steps is performed on the opaque layer set of the second electrode mixture layer and the solid electrolyte layer with the second electrode mixture layer regarded as the first opaque layer and the solid electrolyte layer regarded as the second opaque layer. In this manner, a thickness T1 of the second electrode mixture layer that is the first opaque layer can be acquired.

In addition, the processing of the first to fifth steps is performed on the opaque layer set of the current collector and the first electrode mixture layer with the current collector regarded as the first opaque layer and the first electrode mixture layer regarded as the second opaque layer. In this manner, a thickness T2 of the current collector that is the first opaque layer can be acquired.

Subsequently, the processing of the first to fifth steps is performed on the opaque layer set of the first electrode mixture layer and the solid electrolyte layer with the first electrode mixture layer regarded as the first opaque layer and the solid electrolyte layer regarded as the second opaque layer. Then, a thickness T3 of the first electrode mixture layer that is the first opaque layer can be acquired. The pulse laser applying with respect to the first electrode mixture layer is performed on an exposed portion (exposed surface) of the first electrode mixture layer exposed by a portion to be removed from the current collector being removed through the previously-performed pulse laser applying with respect to the current collector.

In addition, the total thickness Tt of the laminated battery material that is the opaque laminated body is measured by the known method (by the use of, for example, the contact-type thickness measuring instrument). This measurement may be performed at any timing. Specifically, this measurement may be performed before the processing of the first to fifth steps with respect to any one of the opaque layer sets or may be performed after the processing of the first to fifth steps with respect to any one of the opaque layer sets.

Then, a difference value (Tt−(T1+T2+T3)) that is obtained by subtracting the sum (=T1+T2+T3) of the acquired thickness T1 of the second electrode mixture layer, the acquired thickness T2 of the current collector, and the acquired thickness T3 of the first electrode mixture layer from the measured total thickness Tt of the opaque laminated body (laminated battery material) is calculated, and this difference value is acquired as the thickness of the solid electrolyte layer. In this manner, the thickness of each of all the opaque layers that constitute the laminated battery material which is the opaque laminated body can be grasped.

In the laminated battery material described above, the solid electrolyte layer is interposed between the first electrode mixture layer (such as a negative electrode mixture layer) and the second electrode mixture layer (such as a positive electrode mixture layer) and this solid electrolyte layer also functions as an insulating layer for electrical insulation between the first electrode mixture layer and the second electrode mixture layer. Accordingly, when a through-hole is made in the solid electrolyte layer with the solid electrolyte layer to which pulse laser is applied for the measurement of the thickness of the solid electrolyte layer, the electrical insulation between the first electrode mixture layer and the second electrode mixture layer cannot be ensured in some cases. This laminated battery material cannot be used for battery manufacturing (an internal short circuit might occur in a battery in a case where this laminated battery material is used), and thus is discarded after the opaque layer thickness measurement.

In contrast, according to the above-described measurement method, the thickness of each of the layers including the solid electrolyte layer can be measured with no through-hole attributable to a partial removal (ablation) of the solid electrolyte layer resulting from the pulse laser applying being made in the solid electrolyte layer. Accordingly, the electrical insulation between the first electrode mixture layer and the second electrode mixture layer is ensured even after the opaque layer thickness measurement and the laminated battery material (opaque laminated body) can be used for the battery, without being discarded, as the laminated battery material.

EXAMPLE 1

Hereinafter, Example 1 of the invention will be described with reference to accompanying drawings. An opaque laminated body 10, which is an object to be measured according to this Example 1, will be described first. As illustrated in FIG. 1, the opaque laminated body 10 is an opaque laminated body in which four opaque layers are laminated in their thickness direction TD (vertical direction in FIG. 1). In the opaque laminated body 10, the opaque layers that are adjacent to each other in a laminating direction LD (vertical direction in FIG. 1) have different colors.

Specifically, the opaque laminated body 10 is a laminated battery material including a current collector 11, a first electrode mixture layer 12, a solid electrolyte layer 13, and a second electrode mixture layer 14 as illustrated in FIG. 1. The current collector 11 is an opaque layer. The first electrode mixture layer 12 is an opaque layer that is laminated on a surface 11b of the current collector 11. The solid electrolyte layer 13 is an opaque layer that is laminated on a surface 12b of the first electrode mixture layer 12. The second electrode mixture layer 14 is an opaque layer that is laminated on a surface 13b of the solid electrolyte layer 13. This opaque laminated body 10 is used as an electric power generation element of an all-solid-state lithium secondary battery.

The current collector 11 is a negative electrode current collector formed of a copper foil and is a copper-colored opaque layer. The first electrode mixture layer 12 is a negative electrode mixture layer containing negative electrode active material particles or the like and is a black opaque layer. The solid electrolyte layer 13 is a solid electrolyte layer and is a milky-white opaque layer. The second electrode mixture layer 14 is a positive electrode mixture layer containing positive electrode active material particles or the like and is a gray opaque layer. As described above, in the opaque laminated body 10, the colors of the opaque layers that are adjacent to each other in the laminating direction (vertical direction in FIG. 1) differ from each other. Specifically, the current collector 11 is different in color from the first electrode mixture layer 12, the first electrode mixture layer 12 is different in color from the solid electrolyte layer 13, and the solid electrolyte layer 13 is different in color from the second electrode mixture layer 14.

Figure 2:
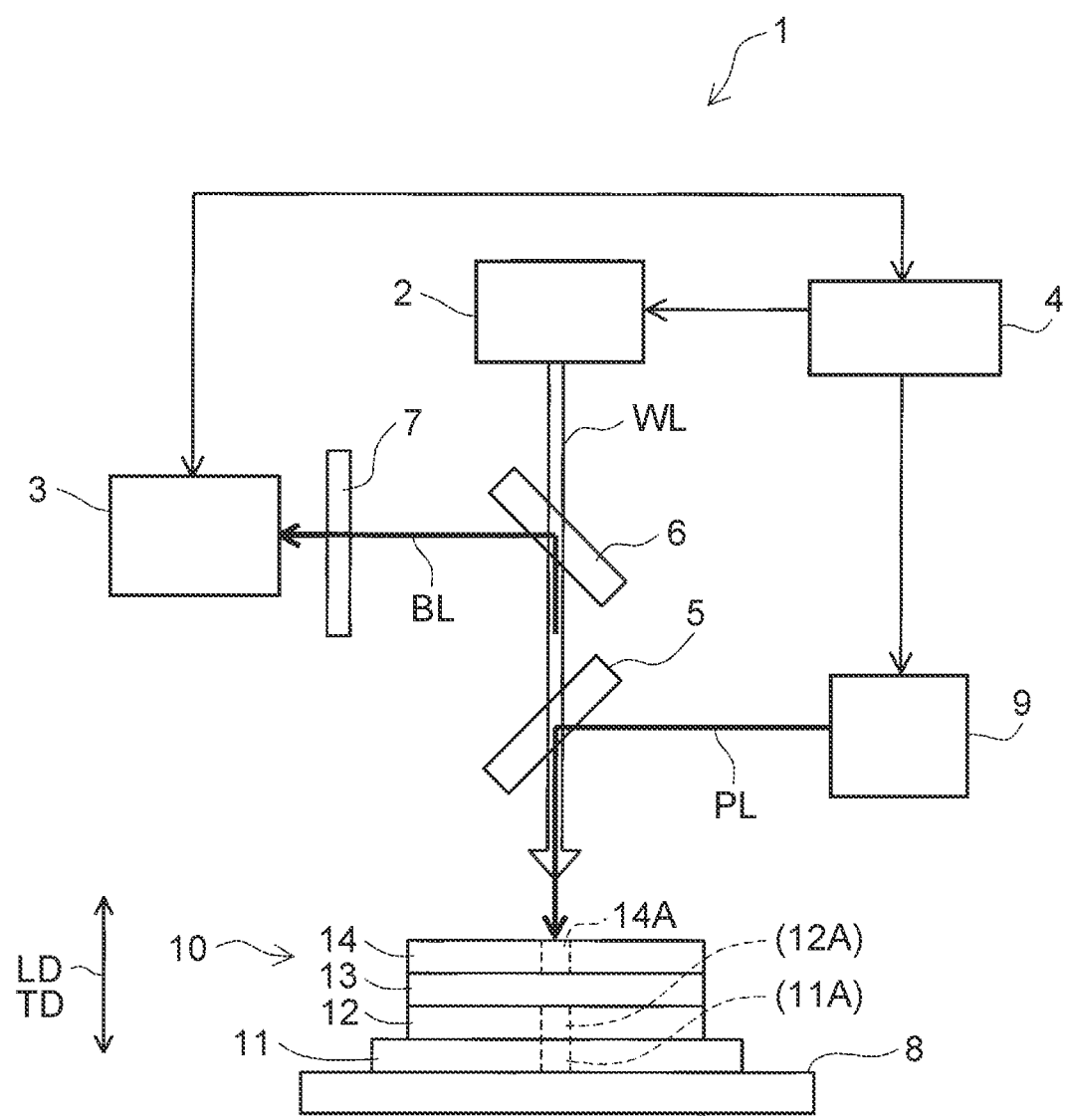
FIG. 2 is a schematic diagram of a measurement device according to Examples 1 and 2.
Figure 3:
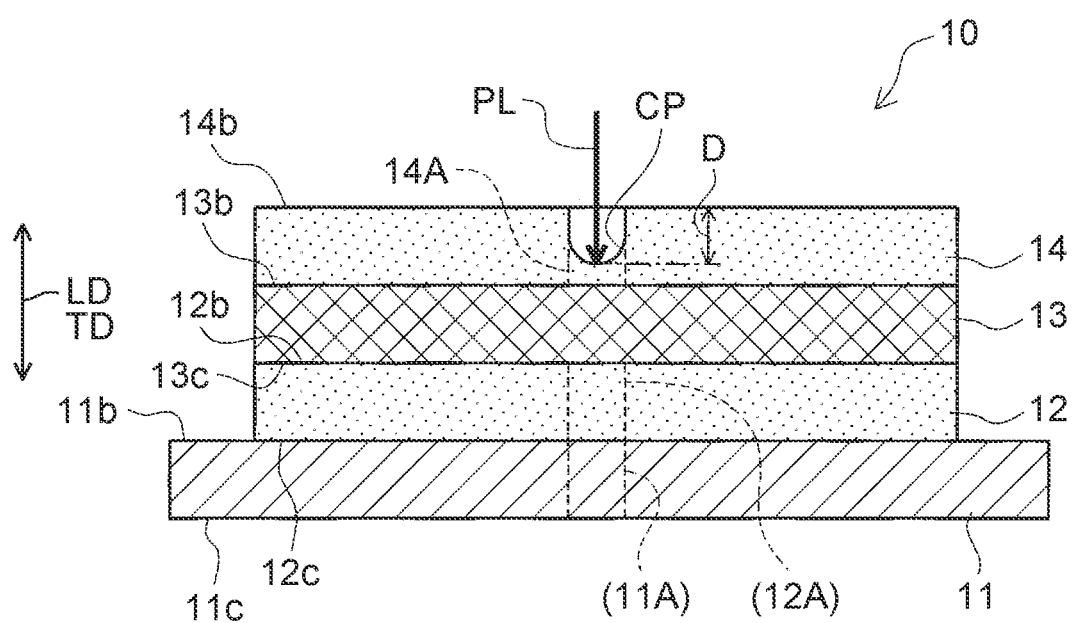
FIG. 3 is a drawing showing a measurement method according to Examples 1 and 2.

The second electrode mixture layer 14 has columnar portions to be removed 14A that are positioned across the entire thickness of the second electrode mixture layer 14 (refer to FIGS. 2 and 3). This portion to be removed 14A is a region that is to be removed (ablated) by pulse laser PL applying (described later). In FIGS. 2 and 3, portions to be removed 11A, 12A according to Example 2 (described later) are shown in parentheses, too.

The layer thickness measurement method for an opaque laminated body according to Example 1 will be described below. A measurement device 1 that is used in this Example 1 will be described first. As illustrated in FIG. 2, the measurement device 1 is provided with a white light source 2, a spectrum analyzer 3, a data processing unit 4, a dichroic mirror 5, a half mirror 6, a ND filter 7, a stage 8, a laser oscillator 9, and a contact-type thickness measuring instrument (not illustrated).

The laser oscillator 9 is a device that generates the pulse laser PL (specifically, picosecond laser, which is pulse laser with a pulse width that is an order of picoseconds). The stage 8 is a member on which the object to be measured (opaque laminated body 10 in this Example 1) is mounted. The white light source 2 is a device that emits white light WL downward. The dichroic mirror 5 is characterized by allowing the white light WL to be transmitted through the dichroic mirror 5 and not allowing the pulse laser PL to be transmitted through the dichroic mirror 5 (reflecting the pulse laser PL).

The half mirror 6 is characterized by allowing 50% of incident light to be transmitted through the half mirror 6 while reflecting 50% of the incident light.

Accordingly, 50% of the white light WL that is emitted from the white light source 2 is transmitted through the half mirror 6, and then transmitted through the dichroic mirror 5 and emitted toward the opaque laminated body 10. In addition, the pulse laser PL that is generated by the laser oscillator 9 is emitted toward the dichroic mirror 5, and then reflected by the dichroic mirror 5 and emitted toward the opaque laminated body 10 (portion to be removed 14A to be specific). In this manner, a part of the opaque laminated body 10 (portion to be removed 14A) can be gradually removed (ablated) by the pulse laser PL as illustrated in FIG. 3.

FIG. 3 is a diagram also illustrating how the portion to be removed 14A from the second electrode mixture layer 14 is removed (ablated) by the pulse laser PL. Specifically, a state at a time when a concave portion CP is formed in the second electrode mixture layer 14 by a part of the portion to be removed 14A from the second electrode mixture layer 14 being removed is illustrated in FIG. 3. In this application, the depth of this concave portion CP (dimension in the thickness direction TD) will be referred to as a removal depth D.

In this Example 1, the white light WL transmitted through the dichroic mirror 5 and the pulse laser PL reflected by the dichroic mirror 5 are coaxially emitted toward the opaque laminated body 10 and are emitted in the laminating direction LD (thickness direction TD) with respect to the opaque laminated body 10. Accordingly, in this Example 1, the white light WL can be applied to a region that is exposed with at least a part of the portion to be removed 14A removed (exposed surface) in the thickness direction TD (laminating direction LD) while the portion to be removed 14A is gradually removed (ablated) in the thickness direction TD (sublimated in the thickness direction TD) by the portion to be removed 14A to which the pulse laser PL is applied in the thickness direction TD.

The spectrum analyzer 3 is a device that acquires reflected light BL of the white light WL (white light WL reflected by the opaque laminated body 10) and performs a spectral analysis for the reflected light BL. The neutral density (ND) filter 7 is characterized by reducing the amount of light passing therethrough. In this Example 1, the white light WL (reflected light BL) reflected by the opaque laminated body 10 (region exposed with at least a part of the portion to be removed 14A removed) is transmitted through the dichroic mirror 5, and then 50% of the reflected light BL is reflected by the half mirror 6 and is incident on the ND filter 7. The reflected light BL incident on the ND filter 7 is captured into the spectrum analyzer 3 in a state where the amount of the light is further reduced by the light passing through the ND filter 7. Then, the spectrum analyzer 3 acquires the reflected light BL and performs the spectral analysis for the reflected light BL at regular time intervals and generates a reflection spectrum obtained through each spectral analysis (intensity distribution data regarding each wavelength component of the reflected light BL).

The data processing unit 4 is provided with a ROM, a RAM, and a CPU (neither of which is illustrated). The data processing unit 4 controls the initiation and termination (ON-OFF) of the emission of the white light WL from the white light source 2. In addition, the data processing unit 4 controls the initiation and termination (ON-OFF) of the emission of the pulse laser PL from the laser oscillator 9. Furthermore, the data processing unit 4 integrates the number of applying pulses of the pulse laser PL during a period in which the removal of the portion to be removed 14A is performed by the pulse laser PL applying.

Moreover, the data processing unit 4 determines, based on the result of the spectral analysis by the spectrum analyzer 3 and at regular time intervals, whether or not the white light WL applying target has changed from the second electrode mixture layer 14 (first opaque layer) to the solid electrolyte layer 13 (second opaque layer) after the pulse laser PL begins to be applied to the portion to be removed 14A from the second electrode mixture layer 14 from a surface 14b side (side opposite to the side with which the solid electrolyte layer 13 that is the second opaque layer is in contact) of the second electrode mixture layer 14 (first opaque layer) with the second electrode mixture layer 14 regarded as the first opaque layer and the solid electrolyte layer 13 regarded as the second opaque layer in the opaque layer set of the second electrode mixture layer 14 and the solid electrolyte layer 13.

Figure 4:
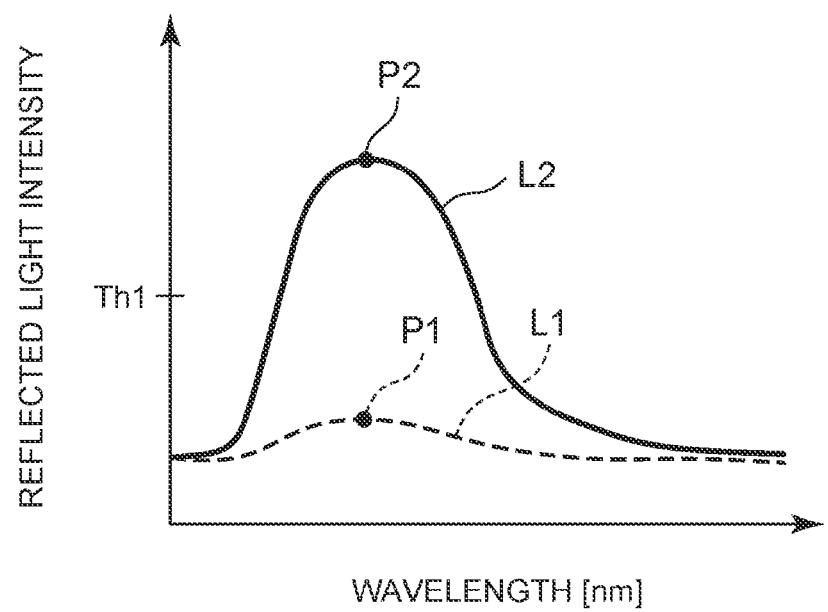
FIG. 4 is a drawing in which spectral distributions of reflected light are compared to each other.

Specifically, as "determining whether or not the white light WL applying target has changed from the second electrode mixture layer 14 (first opaque layer) to the solid electrolyte layer 13 (second opaque layer) based on the result of the spectral analysis by the spectrum analyzer 3", "determining whether or not the maximum value of the light intensity (corresponding to the peak value of the curve representing the intensity distribution, refer to FIG. 4) in the reflection spectrum obtained through the spectral analysis by the spectrum analyzer 3 (intensity distribution data regarding each wavelength component of the reflected light BL) has reached a threshold Th1 set in advance (has become a value equal to or higher than the threshold Th1)" is performed. The threshold Th1 set in advance is stored in the ROM of the data processing unit 4.

The threshold Th1 is a threshold for determining that the target to which the white light WL is applied has changed from the second electrode mixture layer 14 (first opaque layer) to the solid electrolyte layer 13 (second opaque layer) by the portion to be removed 14A being removed by the pulse laser PL applying. The second electrode mixture layer 14 and the solid electrolyte layer 13 are different in color from each other, and thus the intensities of the reflected light BL differ from each other even in the event of the applying corresponding to equivalent white light WL. Accordingly, when the target to which the white light WL is applied changes from the second electrode mixture layer 14 to the solid electrolyte layer 13, the intensity of the reflected light BL changes as well. Since the second electrode mixture layer 14 is gray and the solid electrolyte layer 13 is milky-white, the intensity of the reflected light BL (maximum intensity of the reflection spectrum) increases when the target to which the white light WL is applied changes from the second electrode mixture layer 14 to the solid electrolyte layer 13. The threshold Th1 is set, by the use of this property, to a value at which it can be determined that the white light WL applying target has changed from the second electrode mixture layer 14 to the solid electrolyte layer 13.

Specifically, for example, the maximum value of the light intensity (value of a peak P1 of a curve L1 representing the intensity distribution) in the reflection spectrum (result of the spectral analysis for the reflected light BL) at a time when the white light WL is applied to the second electrode mixture layer 14 and the maximum value of the light intensity (value of a peak P2 of a curve L2 representing the intensity distribution) in the reflection spectrum at a time when the white light WL is applied to the solid electrolyte layer 13 may be measured by the use of the measurement device 1 and a value between the two maximum light intensity values (such as a median value) may be set as the threshold Th1 in advance as illustrated in FIG. 4. Then, it can be determined that the target to which the white light WL is applied (that is, the target to which the pulse laser PL is applied) changes from the second electrode mixture layer 14 to the solid electrolyte layer 13 when the maximum value of the light intensity in the reflection spectrum is determined by the data processing unit 4 to reach the threshold Th1 (become the value equal to or higher than the threshold Th1). At this time, it can be determined that the surface 13b of the solid electrolyte layer 13 is exposed with the portion to be removed 14A from the second electrode mixture layer 14 removed.

After it is determined that the target to which the white light WL is applied has changed from the second electrode mixture layer 14 (first opaque layer) to the solid electrolyte layer 13 (second opaque layer), after it is determined that the maximum value of the light intensity in the reflection spectrum has reached the threshold Th1 (has become the value equal to or higher than the threshold Th1) to be specific, the data processing unit 4 obtains the removal depth D of the second electrode mixture layer 14 (first opaque layer) corresponding to the integrated value from the integrated value of the number of applying pulses (number of times) integrated thus far (until the determination that the maximum value of the reflected light intensity has reached the threshold Th1 after the initiation of the integration of the number of applying pulses of the pulse laser PL) by using the previously-grasped "correlation between the number of applying pulses (number of times) of the pulse laser PL and the removal depth of the second electrode mixture layer 14 (first opaque layer)" and then acquires the removal depth D as the thickness of the second electrode mixture layer 14 (first opaque layer).

Then, the thickness of the second electrode mixture layer 14 (first opaque layer) can be acquired immediately after the removal of the portion to be removed 14A from the second electrode mixture layer 14 (first opaque layer) by the pulse laser PL applying. Hence, by the measurement method according to this Example 1, the thickness of the second electrode mixture layer 14 (first opaque layer) can be grasped in a period of time that is substantially equal to a period of time which is required for the removal (ablation) of the portion to be removed 14A from the second electrode mixture layer 14 (first opaque layer) by the pulse laser PL applying (removal time+calculation processing time). Accordingly, it can be said that the measurement method according to this Example 1 is a method by which the thickness of an opaque layer can be measured within a short period of time.

The "correlation between the number of applying pulses (number of times) of the pulse laser PL and the removal depth D of the second electrode mixture layer 14 (first opaque layer)" can be grasped as follows. Specifically, second electrode mixture layer 14 for testing purposes is prepared, the pulse laser PL is applied to this second electrode mixture layer 14 by the number of pulses (number of times) determined in advance in the thickness direction by the use of the measurement device 1, and then this second electrode mixture layer 14 is removed (ablated) in the thickness direction thereof. Then, with regard to this second electrode mixture layer 14, the depth of the concave portion CP (=removal depth D, refer to FIG. 3) formed by the pulse laser PL applying (ablation) is measured by a known method (such as SEM-based observation of a section of the concave portion CP). In this manner, a set (N, D) of the number of applying pulses N (number of time) of the pulse laser PL and the removal depth D (μm) of the second electrode mixture layer 14 is obtained.

Figure 5:
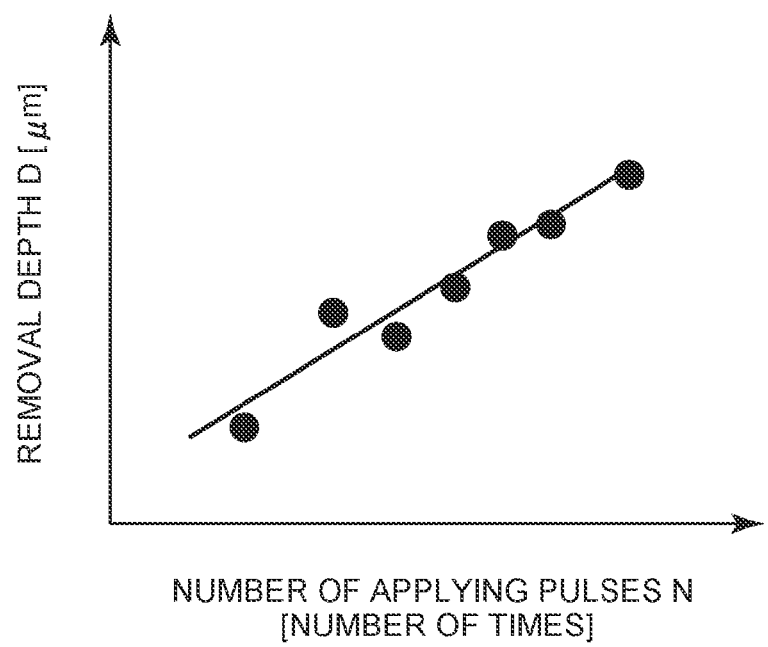
FIG. 5 is a drawing illustrating a correlation between the number of applying pulses of pulse laser and a removal depth.

In addition, the removal depth D is measured as described above with the number of applying pulses N of the pulse laser PL allowed to vary and a plurality of different sets (N, D) of the number of applying pulses N (number of time) and the removal depth D (μm) of the second electrode mixture layer 14 are acquired. Then, as illustrated in FIG. 5, the measured data are plotted on a plane of coordinates with a horizontal axis representing the number of applying pulses N (number of times) and a vertical axis representing the removal depth D (μm). Then, the plotted data are first-order approximated by the use of a least-square method, and a relational expression (linear expression) of the number of applying pulses N and the removal depth D is obtained. As described above, in this Example 1, the "relational expression (linear expression) of the number of applying pulses N and the removal depth D" is used as the "correlation between the number of applying pulses N (number of times) of the pulse laser PL and the removal depth D of the second electrode mixture layer 14 (first opaque layer)".

Figure 6:
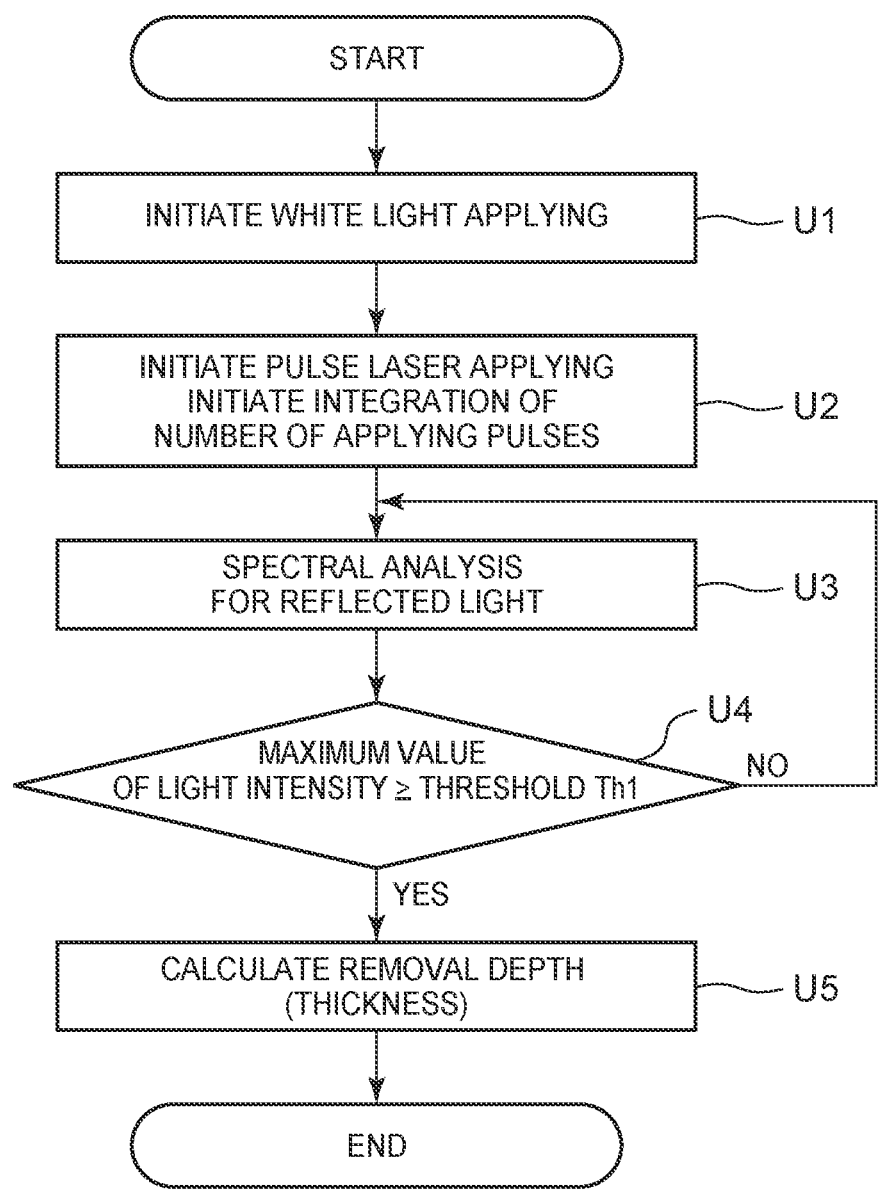
FIG. 6 is a flowchart illustrating the flow of the measurement method according to Example 1.

Hereinafter, the flow of the layer thickness measurement method for an opaque laminated body according to this Example 1 will be described. FIG. 6 is a flowchart illustrating the flow of the measurement method according to Example 1. Specifically, the white light source 2 is turned ON first, based on a command from the data processing unit 4, in Step U1 (first step) as illustrated in FIG. 6 in a state where the opaque laminated body 10 is set on the stage 8 of the measurement device 1 (refer to FIG. 2) with the second electrode mixture layer 14 directed upward and a back surface 11c of the current collector 11 in contact with a surface (upper surface) of the stage 8. In this manner, the white light WL begins to be applied to the portion to be removed 14A (refer to FIGS. 2 and 3) from the second electrode mixture layer 14 (first opaque layer), in the thickness direction TD of the second electrode mixture layer 14 (vertical direction in FIG. 2, laminating direction LD), from the side opposite to the side with which the solid electrolyte layer 13 (second opaque layer) is in contact (upper side in FIG. 2).

Then, the processing proceeds to Step U2 (second step), and the laser oscillator 9 (refer to FIG. 2) is driven based on a command from the data processing unit 4 and the pulse laser PL is generated so that the portion to be removed 14A from the second electrode mixture layer 14 (first opaque layer) is removed. In this manner, the pulse laser PL begins to be applied to the portion to be removed 14A from the second electrode mixture layer 14, in the thickness direction TD of the second electrode mixture layer 14, from the side opposite to the side with which the solid electrolyte layer 13 (second opaque layer) is in contact (upper side in FIG. 2). In addition, the data processing unit 4 initiates the integration of the number of applying pulses (number of times) of the pulse laser PL once the pulse laser PL applying is initiated.

Then, the processing proceeds to Step U3 (third step), in which the spectrum analyzer 3 performs the spectral analysis for the acquired reflected light BL (white light WL emitted from the white light source 2 and reflected by the opaque laminated body 10) at regular time intervals based on a command from the data processing unit 4 and begins to generate the reflection spectrum obtained through each spectral analysis (intensity distribution data regarding each wavelength component of the reflected light BL).

Then, the processing proceeds to Step U4 (fourth step), in which the data processing unit 4 determines, based on the result of the spectral analysis by the spectrum analyzer 3, whether or not the white light WL applying target has changed from the second electrode mixture layer 14 (first opaque layer) to the solid electrolyte layer 13 (second opaque layer). Specifically, it is determined whether or not the maximum value of the light intensity (corresponding to the peak value of the curve representing the intensity distribution) in the reflection spectrum obtained through the spectral analysis by the spectrum analyzer 3 (intensity distribution data regarding each wavelength component of the reflected light BL) has reached the threshold Th1 set in advance (has become the value equal to or higher than the threshold Th1)".

Once it is determined in Step U4 that the maximum value of the light intensity has yet to reach the threshold Th1 (has yet to become the value equal to or higher than the threshold Th1) (NO), the processing returns to Step U3 and the spectral analysis for the reflected light BL newly acquired is performed. Then, once it is determined in Step U4 that the maximum value of the light intensity has reached the threshold Th1 (has become the value equal to or higher than the threshold Th1, that is, the white light WL applying target has changed from the second electrode mixture layer 14 to the solid electrolyte layer 13), the pulse laser PL applying is terminated (stopped), the integration of the number of applying pulses (number of times) of the pulse laser PL is terminated, the removal depth D of the second electrode mixture layer 14 (first opaque layer) is calculated in Step U5, and the removal depth D is acquired as the thickness of the second electrode mixture layer 14 (first opaque layer).

Specifically, the integrated value of the number of applying pulses (number of times) integrated thus far (until the termination of the integration of the number of applying pulses after the initiation of the integration of the number of applying pulses of the pulse laser PL in Step U2) is assigned to the "relational expression (linear expression) of the number of applying pulses N (number of times) of the pulse laser PL and the removal depth D of the second electrode mixture layer 14 (first opaque layer)" that is stored in the ROM of the data processing unit 4 and the removal depth D of the second electrode mixture layer 14 (first opaque layer) corresponding to this integrated value is calculated. Then, the calculated removal depth D is acquired as the thickness of the second electrode mixture layer 14 (first opaque layer). As described above, the thickness of the second electrode mixture layer 14, which is an opaque layer, can be measured with regard to the opaque laminated body 10, in which the plurality of opaque layers are laminated, by the processing of Step U1 (first step) to U5 (fifth step) being performed.

EXAMPLE 2

Hereinafter, Example 2 of the invention will be described with reference to accompanying drawings. This Example 2 differs from Example 1 in that the thickness of every opaque layer constituting the opaque laminated body 10 is grasped and in that the depths of three portions to be removed are measured with regard to each opaque layer and the average value of the measured results is acquired as the thickness of each opaque layer. Example 2 is similar to Example 1 in the other aspects. Accordingly, the following description will focus on the differences from Example 1 while description of the similar aspects is omitted or simplified.

In this Example 2, the current collector 11 has the columnar portion to be removed 11A that is positioned across the entire thickness of the current collector 11 (refer to FIGS. 2 and 3). This portion to be removed 11A is a region that is to be removed (ablated) by pulse laser PL applying (described later). Likewise, the first electrode mixture layer 12 has the columnar portions to be removed 12A that are positioned across the entire thickness of the first electrode mixture layer 12 (refer to FIGS. 2 and 3). This portion to be removed 12A is a region that is to be removed (ablated) by pulse laser PL applying (described later).

The layer thickness measurement method for an opaque laminated body according to this Example 2 will be described below. In this Example 2, the thickness of the opaque layer that constitutes the opaque laminated body 10 is measured by the use of the measurement device 1 (refer to FIG. 2) as in Example 1.

As in Example 1, the data processing unit 4 of the measurement device 1 determines, based on the result of the spectral analysis by the spectrum analyzer 3 and at regular time intervals, whether or not the white light WL applying target has changed from the second electrode mixture layer 14 (first opaque layer) to the solid electrolyte layer 13 (second opaque layer) after the pulse laser PL begins to be applied to the portion to be removed 14A from the second electrode mixture layer 14 with the second electrode mixture layer 14 regarded as the first opaque layer and the solid electrolyte layer 13 regarded as the second opaque layer in the opaque layer set of the second electrode mixture layer 14 and the solid electrolyte layer 13. Specifically, the data processing unit 4 determines whether or not the maximum value of the light intensity in the reflection spectrum obtained through the spectral analysis by the spectrum analyzer 3 has reached the threshold Th1 set in advance.

In addition, the data processing unit 4 determines, based on the result of the spectral analysis by the spectrum analyzer 3 and at regular time intervals, whether or not the white light WL applying target has changed from the current collector 11 (first opaque layer) to the first electrode mixture layer 12 (second opaque layer) after the pulse laser PL begins to be applied to the portion to be removed 11A from the current collector 11 from the back surface 11c side (side opposite to the side with which the first electrode mixture layer 12 that is the second opaque layer is in contact) of the current collector 11 (first opaque layer) with the current collector 11 regarded as the first opaque layer and the first electrode mixture layer 12 regarded as the second opaque layer in the opaque layer set of the current collector 11 and the first electrode mixture layer 12. Specifically, the data processing unit 4 determines whether or not the maximum value of the light intensity in the reflection spectrum obtained through the spectral analysis by the spectrum analyzer 3 has reached a threshold Th2 set in advance. The threshold Th2 set in advance is stored in the ROM of the data processing unit 4.

The threshold Th2 is a threshold for determining that the target to which the white light WL is applied has changed from the current collector 11 (first opaque layer) to the first electrode mixture layer 12 (second opaque layer) by the portion to be removed 11A being removed by the pulse laser PL applying. Since the current collector 11 is copper-colored and the first electrode mixture layer 12 is black, the intensity of the reflected light BL (maximum intensity of the reflection spectrum) decreases when the target to which the white light WL is applied changes from the current collector 11 to the first electrode mixture layer 12. The threshold Th2 is set, by the use of this property, to a value at which it can be determined that the white light WL applying target has changed from the current collector 11 to the first electrode mixture layer 12.

The maximum value of the light intensity in the reflection spectrum at a time when the white light WL is applied to the current collector 11 and the maximum value of the light intensity (peak value of the curve representing the intensity distribution) in the reflection spectrum at a time when he white light WL is applied to the first electrode mixture layer 12 may be measured by the use of the measurement device 1 and a value between the two maximum light intensity values (such as a median value) may be set as the threshold Th2 in advance as in the case of the threshold Th1 described above. Then, it can be determined that the target to which the white light WL is applied (that is, the target to which the pulse laser PL is applied) changes from the current collector 11 to the first electrode mixture layer 12 when the maximum value of the light intensity in the reflection spectrum is determined by the data processing unit 4 to reach the threshold Th2.

After it is determined that the target to which the white light WL is applied has changed from the current collector 11 (first opaque layer) to the first electrode mixture layer 12 (second opaque layer), after it is determined that the maximum value of the light intensity in the reflection spectrum has reached the threshold Th2 to be specific, the data processing unit 4 obtains the removal depth D of the current collector 11 (first opaque layer) corresponding to the integrated value from the integrated value of the number of applying pulses (number of times) integrated thus far by using the previously-grasped "correlation between the number of applying pulses (number of times) of the pulse laser PL and the removal depth of the current collector 11" and then acquires the removal depth D as the thickness of the current collector 11. In this manner, the thickness of the current collector 11 (first opaque layer) can be acquired immediately after the removal of the portion to be removed 11A from the current collector 11 (first opaque layer) by t the pulse laser PL applying.

The "correlation between the number of applying pulses (number of times) of the pulse laser PL and the removal depth D of the current collector 11 (first opaque layer) (relational expression of the number of applying pulses N and the removal depth D to be specific)" is grasped in advance as is the method for obtaining the above-described "correlation between (relational expression of) the number of applying pulses N (number of times) of the pulse laser PL and the removal depth D of the second electrode mixture layer 14 (first opaque layer)" (refer to FIG. 5).

In addition, the data processing unit 4 determines, based on the result of the spectral analysis by the spectrum analyzer 3 and at regular time intervals, whether or not the white light WL applying target has changed from the first electrode mixture layer 12 (first opaque layer) to the solid electrolyte layer 13 (second opaque layer) after the pulse laser PL begins to be applied to the portion to be removed 12A from the first electrode mixture layer 12 from a back surface 12c side (side opposite to the side with which the solid electrolyte layer 13 that is the second opaque layer is in contact) of the first electrode mixture layer 12 (first opaque layer) with the first electrode mixture layer 12 regarded as the first opaque layer and the solid electrolyte layer 13 regarded as the second opaque layer in the opaque layer set of the first electrode mixture layer 12 and the solid electrolyte layer 13. Specifically, the data processing unit 4 determines whether or not the maximum value of the light intensity in the reflection spectrum obtained through the spectral analysis by the spectrum analyzer 3 has reached a threshold Th3 set in advance. The threshold Th3 set in advance is stored in the ROM of the data processing unit 4.

The threshold Th3 is a threshold for determining that the target to which the white light WL is applied has changed from the first electrode mixture layer 12 (first opaque layer) to the solid electrolyte layer 13 (second opaque layer) by the portion to be removed 12A being removed by the pulse laser PL applying. Since the first electrode mixture layer 12 is black and the solid electrolyte layer 13 is milky-white, the intensity of the reflected light BL (maximum intensity of the reflection spectrum) increases when the target to which the white light WL is applied changes from the first electrode mixture layer 12 to the solid electrolyte layer 13. The threshold Th3 is set, by the use of this property, to a value at which it can be determined that the white light WL applying target has changed from the first electrode mixture layer 12 to the solid electrolyte layer 13.

The maximum value of the light intensity in the reflection spectrum at a time when the white light WL is applied to the first electrode mixture layer 12 and the maximum value of the light intensity in the reflection spectrum at a time when the white light WL is applied to the solid electrolyte layer 13 may be measured by the use of the measurement device 1 and a value between the two maximum light intensity values (such as a median value) may be set as the threshold Th3 as in the case of the threshold Th1 described above. Then, it can be determined that the target to which the white light WL is applied (that is, the target to which the pulse laser PL is applied) changes from the first electrode mixture layer 12 to the solid electrolyte layer 13 when the maximum value of the light intensity in the reflection spectrum is determined by the data processing unit 4 to reach the threshold Th3.

After it is determined that the target to which the white light WL is applied has changed from the first electrode mixture layer 12 (first opaque layer) to the solid electrolyte layer 13 (second opaque layer), after it is determined that the maximum value of the light intensity in the reflection spectrum has reached the threshold Th3 to be specific, the data processing unit 4 obtains the removal depth D of the first electrode mixture layer 12 corresponding to the integrated value from the integrated value of the number of applying pulses (number of times) integrated thus far by using the previously-grasped "correlation between the number of applying pulses (number of times) of the pulse laser PL and the removal depth of the first electrode mixture layer 12 (first opaque layer)" and then acquires the removal depth D as the thickness of the first electrode mixture layer 12. In this manner, the thickness of the first electrode mixture layer 12 can be acquired immediately after the removal of the portion to be removed 12A from the first electrode mixture layer 12 by the pulse laser PL applying.

The "correlation between the number of applying pulses (number of times) of the pulse laser PL and the removal depth D of the first electrode mixture layer 12 (first opaque layer)" is grasped in advance as a linear expression as is the method for obtaining the above-described "correlation between (relational expression of) the number of applying pulses N (number of times) of the pulse laser PL and the removal depth D of the second electrode mixture layer 14 (first opaque layer)" (refer to FIG. 5).

Figure 7:
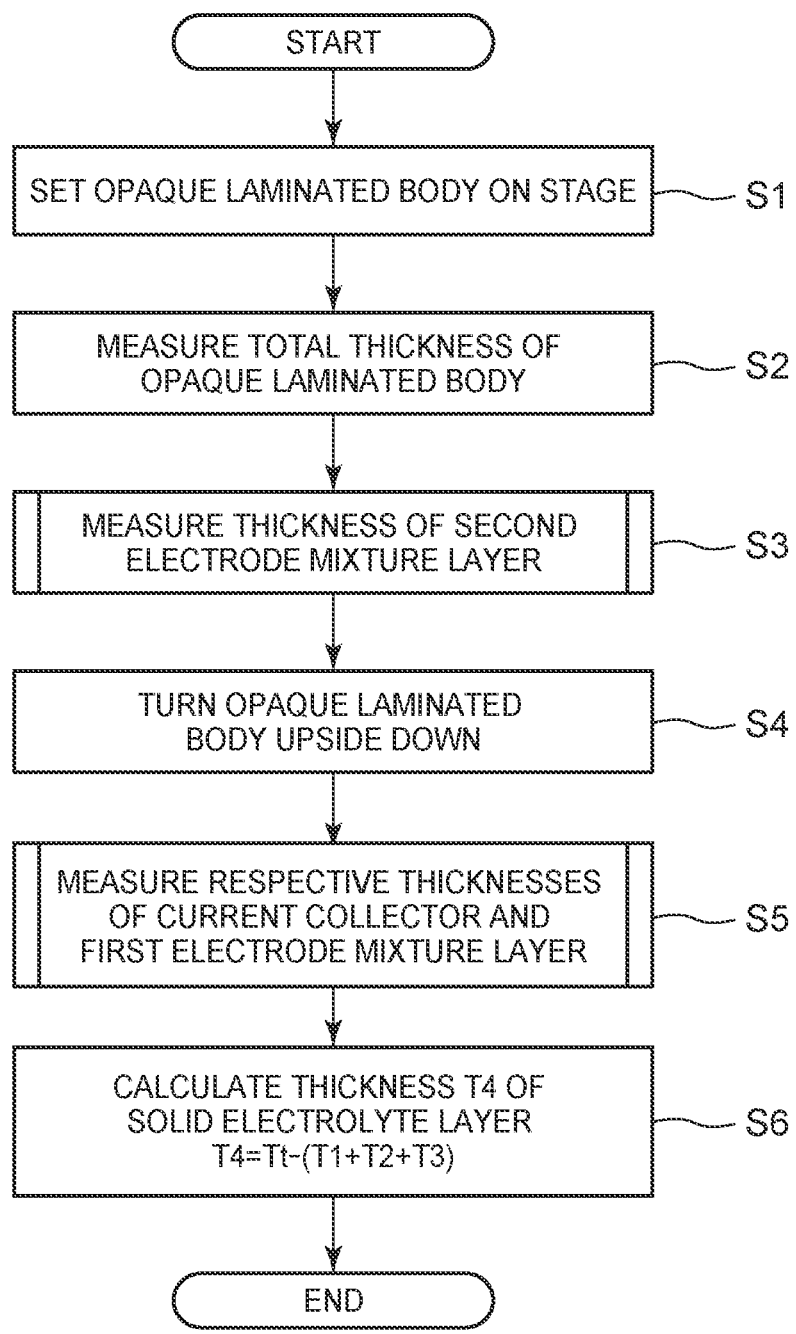
FIG. 7 is a main routine of a flowchart illustrating the flow of the measurement method according to Example 2.
Figure 8:
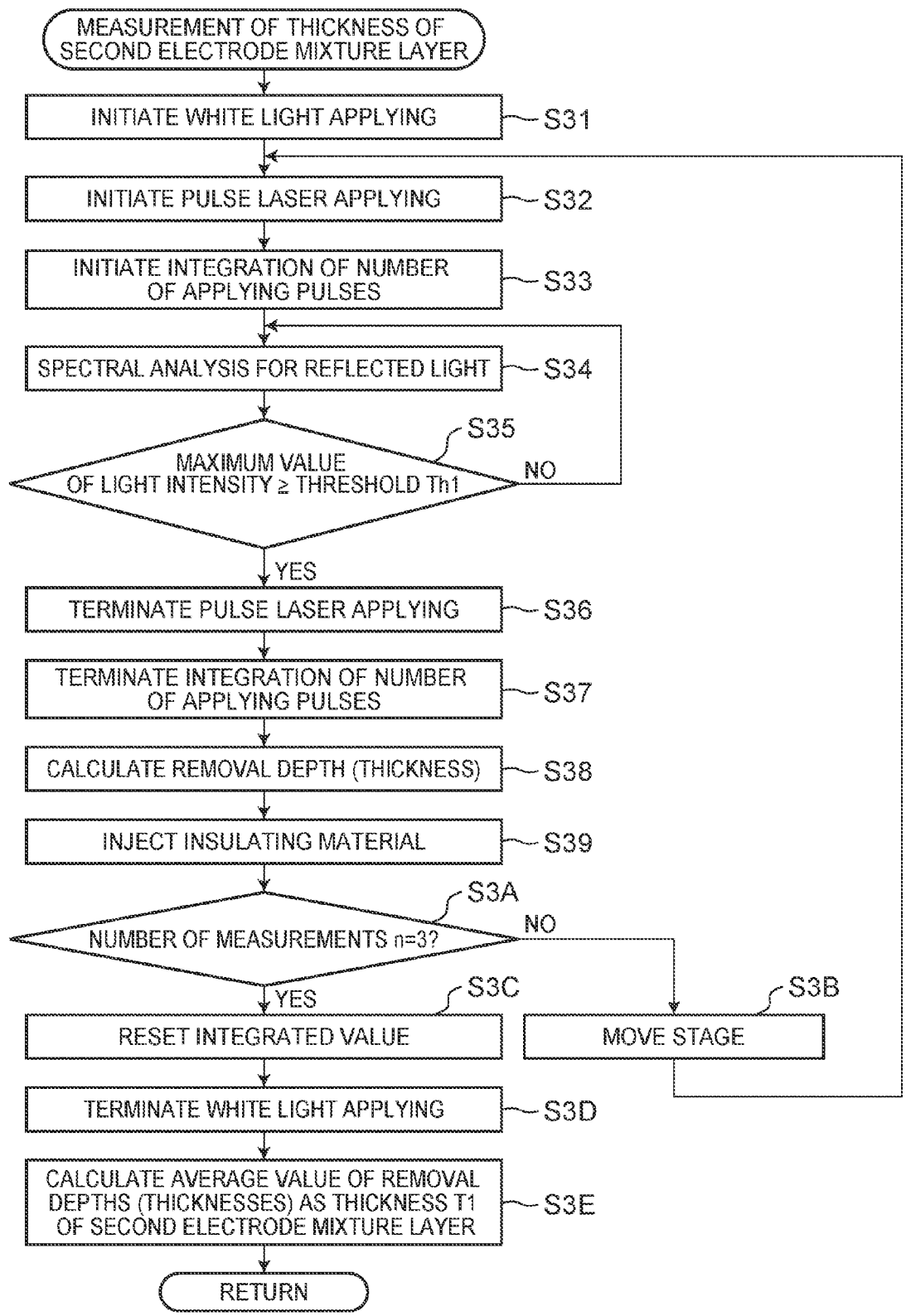
FIG. 8 is a subroutine of the flowchart illustrating the flow of the measurement method according to Example 2.
Figure 9:
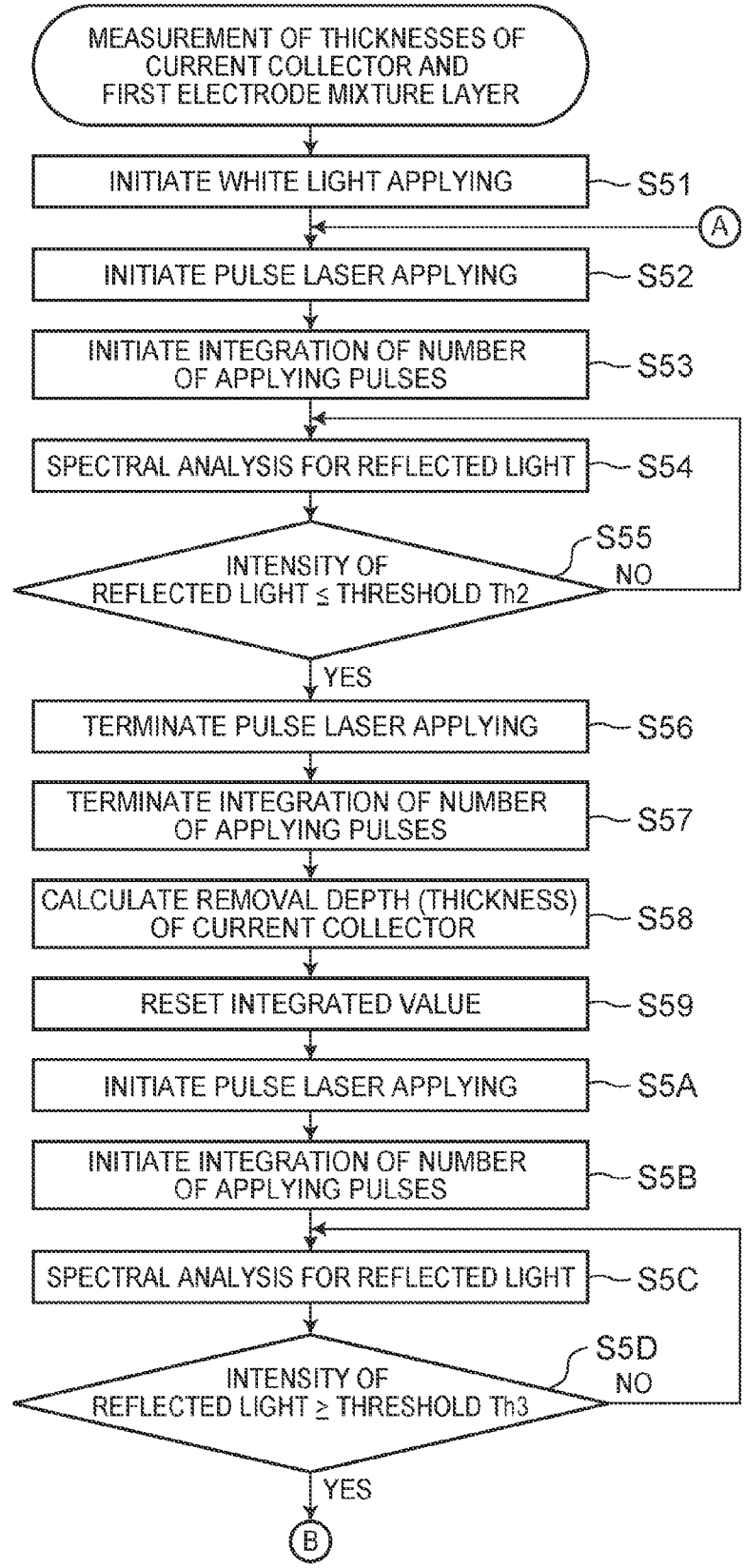
FIG. 9 is a part of the other subroutine of the flowchart illustrating the flow of the measurement method according to Example 2.
Figure 10:
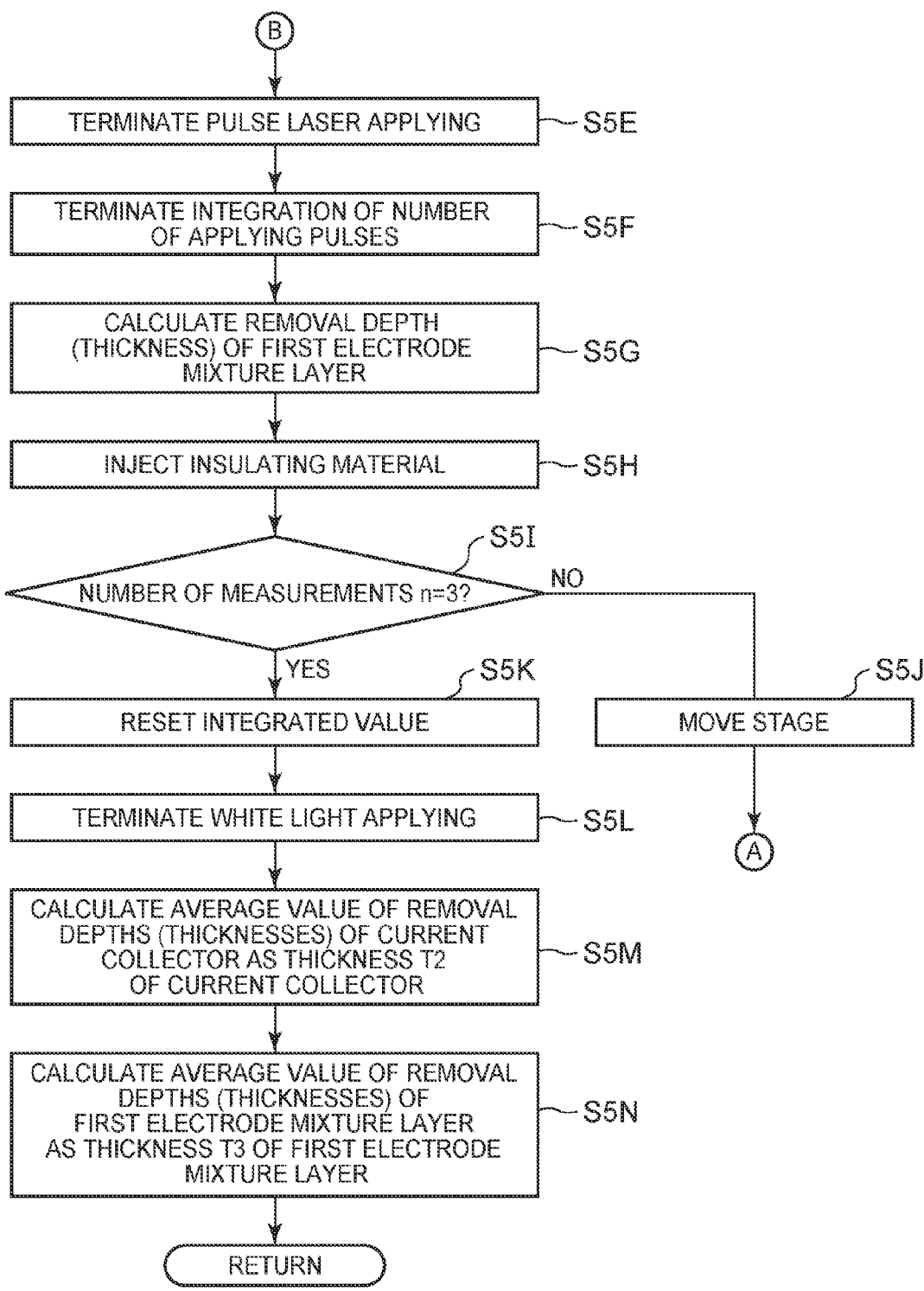
FIG. 10 is a part of the other subroutine, which shows the whole of the other subroutine in combination with FIG. 9.

The flow of the layer thickness measurement method for an opaque laminated body according to this Example 2 will be described below. FIG. 7 is a main routine of a flowchart illustrating the flow of the measurement method according to Example 2. FIG. 8 is a subroutine of the flowchart illustrating the flow of the measurement method according to Example 2. FIGS. 9 and 10 are the other subroutine of the flowchart illustrating the flow of the measurement method according to Example 2. A series of the subroutine is illustrated in FIGS. 9 and 10.

Firstly, the opaque laminated body 10 is set on the stage 8 of the measurement device 1 in Step S1 as illustrated in FIG. 7 (refer to FIG. 2). Specifically, the opaque laminated body 10 is set on the stage 8 with the second electrode mixture layer 14 directed upward and the back surface 11c of the current collector 11 in contact with the surface (upper surface) of the stage 8.

Then, the processing proceeds to Step S2, and the total thickness Tt of the opaque laminated body 10 is measured by a known method (by the use of a contact-type thickness measuring instrument (not illustrated) to be specific). Specifically, a sensor of the contact-type thickness measuring instrument (not illustrated) is moved downward from above the opaque laminated body 10 and the sensor of the contact-type thickness measuring instrument is brought into contact with an upper surface of the opaque laminated body 10 (surface 14b of the second electrode mixture layer 14). Then, the total thickness Tt of the opaque laminated body 10 can be measured. The surface (upper surface) of the stage 8 is set to a zero reference of "thickness=0".

Then, the processing proceeds to Step S3, and the thickness of the second electrode mixture layer 14 is measured. Specifically, the thickness of the second electrode mixture layer 14 is measured with the second electrode mixture layer 14 regarded as the first opaque layer and the solid electrolyte layer 13 regarded as the second opaque layer in the opaque layer set of the second electrode mixture layer 14 and the solid electrolyte layer 13. More specifically, the white light source 2 (refer to FIG. 2) is turned ON first based on the command from the data processing unit 4, as in Step U1 of Example 1, in Step S31 as illustrated in FIG. 8. Step S31 of this Example 2 corresponds to the first step.

Then, the processing proceeds to Step S32, in which the laser oscillator 9 (refer to FIG. 2) is driven based on the command from the data processing unit 4 and the pulse laser PL is generated as in Step U2 of Example 1. Then, the pulse laser PL begins to be applied to the portion to be removed 14A from the second electrode mixture layer 14 in the thickness direction TD of the second electrode mixture layer 14. Then, the processing proceeds to Step S33, in which the data processing unit 4 initiates the integration of the number of applying pulses (number of times) of the pulse laser PL once the pulse laser PL applying is initiated. In this Example 2, the second electrode mixture layer 14 has the three portions to be removed 14A. Accordingly, in this Example 2, the pulse laser PL is applied to these portions to be removed 14A and these portions to be removed 14A are removed (ablated) by each of the three portions to be removed 14A from the second electrode mixture layer 14. Steps S32 and S33 of this Example 2 correspond to the second step.

Then, the processing proceeds to Step S34, in which the spectrum analyzer 3 performs the spectral analysis for the acquired reflected light BL at regular time intervals based on the command from the data processing unit 4 and begins to generate the reflection spectrum obtained through each spectral analysis as in Step U3 of Example 1. Step S34 of this Example 2 corresponds to the third step.

Then, the processing proceeds to Step S35, in which the data processing unit 4 determines, as in Step U4 of Example 1, whether or not the maximum value of the light intensity in the reflection spectrum obtained through the spectral analysis by the spectrum analyzer 3 has reached the threshold Th1 set in advance (has become the value equal to or higher than the threshold Th1). Step S35 of this Example 2 corresponds to the fourth step.

Once it is determined in Step S35 that the maximum value of the light intensity has yet to reach the threshold Th1 (has yet to become the value equal to or higher than the threshold Th1) (NO), the processing returns to Step S34 and the spectral analysis for the newly acquired reflected light BL is performed. Then, once it is determined in Step S35 that the maximum value of the light intensity has reached the threshold Th1, the processing proceeds to Step S36 and the pulse laser PL applying is terminated (stopped). Then, the processing proceeds to Step S37 and the data processing unit 4 terminates the integration of the number of applying pulses (number of times) of the pulse laser PL.

Subsequently, the processing proceeds to Step S38, in which the removal depth D of the second electrode mixture layer 14 (first opaque layer) is calculated and this removal depth D is acquired as the thickness of the second electrode mixture layer 14 (first opaque layer) as in Step U5 of Example 1.

Then, the processing proceeds to Step S39, in which an insulating material is injected into the concave portion CP formed in the second electrode mixture layer 14 by the pulse laser PL applying (concave portion formed by the removal of the portion to be removed 14A). Although this insulating material injection is not essential, the injection is performed in this Example 2 so that the internal short circuit is reliably prevented and the battery has a higher level of safety. Then, the processing proceeds to Step S3A, and it is determined whether or not the number of measurements n of the removal depth D (thickness) of the second electrode mixture layer 14 has reached "3". In other words, it is determined whether or not the removal depth D (thickness) of the second electrode mixture layer 14 has been measured at the three places of the second electrode mixture layer 14 (three portions to be removed 14A).

Once it is determined in Step S3A that the number of measurements n has yet to reach "3" (NO), the processing proceeds to Step S3B, the stage 8 is subjected to a parallel movement, and the opaque laminated body 10 is moved such that the white light WL and the pulse laser PL are applied to the region of the second electrode mixture layer 14 other than the region to which the pulse laser PL is applied already (the other portion to be removed 14A). Then, the processing returns to Step S32 and a series of the above-described processing (processing of Step S32 to S3A) is performed.

Once it is determined in Step S3A that the number of measurements n has reached "3" (YES), the processing proceeds to Step S3C and the integrated value of the number of applying pulses is reset. Subsequently, the processing proceeds to Step S3D, in which the white light source 2 is turned OFF and the white light WL applying is terminated. Then, the processing proceeds to Step S3E, in which the data processing unit 4 calculates the average value of the removal depths D measured at the three places of the second electrode mixture layer 14 and acquires this average value as the thickness T1 of the second electrode mixture layer 14. Steps S38 and S3E of this Example 2 correspond to the fifth step.

Then, the processing proceeds to Step S4 (refer to FIG. 7), in which the opaque laminated body 10 is set on the stage 8 with the opaque laminated body 10 turned upside down, the current collector 11 directed upward, and the surface 14b of the second electrode mixture layer 14 in contact with the surface (upper surface) of the stage 8. Then, the processing proceeds to Step S5, and each of the thickness of the current collector 11 and the thickness of the first electrode mixture layer 12 is measured. Specifically, the removal depth D (thickness) of the current collector 11 is measured first with the current collector 11 regarded as the first opaque layer and the first electrode mixture layer 12 regarded as the second opaque layer in the opaque layer set of the current collector 11 and the first electrode mixture layer 12.

More specifically, the white light source 2 (refer to FIG. 2) is turned ON first, based on the command from the data processing unit 4, in Step S51 as illustrated in FIGS. 9 and 10. In this manner, the white light WL begins to be applied to the portion to be removed 11A from the current collector 11 (first opaque layer), in the thickness direction TD of the current collector 11 (vertical direction in FIG. 2, laminating direction LD), from the side opposite to the side with which the first electrode mixture layer 12 (second opaque layer) is in contact (upper side in FIG. 2). Step S51 of this Example 2 corresponds to the first step.

Then, the processing proceeds to Step S52, in which the pulse laser PL is generated by the laser oscillator 9 (refer to FIG. 2) based on the command from the data processing unit 4 so that the portion to be removed 11A from the current collector 11 (first opaque layer) is removed and the pulse laser PL begins to be applied to the portion to be removed 11A from the current collector 11 in the thickness direction of the current collector 11 from the side opposite to the side with which the first electrode mixture layer 12 (second opaque layer) is in contact (upper side in FIG. 2). Then, the processing proceeds to Step S53, in which the data processing unit 4 initiates the integration of the number of applying pulses (number of times) of the pulse laser PL. In this Example 2, the current collector 11 has the three portions to be removed 14A. Accordingly, in this Example 2, the pulse laser PL is applied to these portions to be removed 14A and these portions to be removed 14A are removed (ablated) by each of the three portions to be removed 14A from the current collector 11. Steps S52 and S53 of this Example 2 correspond to the second step.

Then, the processing proceeds to Step S54, in which the spectrum analyzer 3 performs the spectral analysis for the acquired reflected light BL (white light WL emitted from the white light source 2 and reflected by the opaque laminated body 10) at regular time intervals based on the command from the data processing unit 4 and begins to generate the reflection spectrum obtained through each spectral analysis (intensity distribution data regarding each wavelength component of the reflected light BL). Step S54 of this Example 2 corresponds to the third step.

Then, the processing proceeds to Step S55, in which the data processing unit 4 determines, based on the result of the spectral analysis by the spectrum analyzer 3, whether or not the white light WL applying target has changed from the current collector 11 (first opaque layer) to the first electrode mixture layer 12 (second opaque layer). Specifically, the data processing unit 4 determines whether or not the maximum value of the light intensity (corresponding to the peak value of the curve representing the intensity distribution) in the reflection spectrum obtained through the spectral analysis by the spectrum analyzer 3 (intensity distribution data regarding each wavelength component of the reflected light BL) has reached the threshold Th2 set in advance (has become a value equal to or lower than the threshold Th2). Step S55 of this Example 2 corresponds to the fourth step.

Once it is determined in Step S55 that the maximum value of the light intensity has yet to reach the threshold Th2 (has yet to become the value equal to or lower than the threshold Th2) (NO), the processing returns to Step S54 and the spectral analysis for the newly acquired reflected light BL is performed. Then, once it is determined in Step S55 that the maximum value of the light intensity has reached the threshold Th2 (has become the value equal to or lower than the threshold Th2, that is, the white light WL applying target has changed from the current collector 11 to the first electrode mixture layer 12), the processing proceeds to Step S56 and the pulse laser PL applying is terminated (stopped). At this time, the portion to be removed 11A from the current collector 11 is removed, and the back surface 12c of the first electrode mixture layer 12 is exposed. Then, the processing proceeds to Step S57 and the data processing unit 4 terminates the integration of the number of applying pulses (number of times) of the pulse laser PL.

Then, the processing proceeds to Step S58, in which the removal depth D of the current collector 11 (first opaque layer) is calculated and this removal depth D is acquired as the thickness of the current collector 11 (first opaque layer). Specifically, the integrated value of the number of applying pulses (number of times) integrated thus far (until the termination of the integration of the number of applying pulses in Step S57 after the initiation of the integration of the number of applying pulses of the pulse laser PL in Step S53) is assigned to the "relational expression (linear expression) of the number of applying pulses N (number of times) of the pulse laser PL and the removal depth D of the current collector 11 (first opaque layer)" that is stored in the ROM of the data processing unit 4 and the removal depth D of the current collector 11 (first opaque layer) corresponding to this integrated value is calculated. Then, the calculated removal depth D is acquired as the thickness of the current collector 11 (first opaque layer).

Then, the processing proceeds to Step S59 and the integrated value of the number of applying pulses is reset. Subsequently, the removal depth D (thickness) of the first electrode mixture layer 12 is measured with the first electrode mixture layer 12 regarded as the first opaque layer and the solid electrolyte layer 13 regarded as the second opaque layer in the opaque layer set of the first electrode mixture layer 12 and the solid electrolyte layer 13.

Specifically, the removal depth D (thickness) of the first electrode mixture layer 12 is obtained by the processing of Steps S5A to S5G being performed as in Steps S52 to S58 described above. In this Example 2, the first electrode mixture layer 12 has the three portions to be removed 12A. Accordingly, in this Example 2, the pulse laser PL is applied to these portions to be removed 12A and these portions to be removed 12A are removed (ablated) by each of the three portions to be removed 12A from the first electrode mixture layer 12. In Step S5A, the pulse laser PL begins to be applied to the back surface 12c of the first electrode mixture layer 12 (portion to be removed 12A), which is exposed by the removal of the portion to be removed 11A from the current collector 11.

In Step S5D, it is determined whether or not the maximum value of the light intensity in the reflection spectrum obtained through the spectral analysis by the spectrum analyzer 3 has reached the threshold Th3 (has become a value equal to or higher than the threshold Th3) by the use of the threshold Th3 differing from that used in Step S55. In this manner, it is determined whether or not the white light WL applying target has changed from the first electrode mixture layer 12 (first opaque layer) to the solid electrolyte layer 13 (second opaque layer). Steps S5A and S5B of this Example 2 correspond to the second step. Step S5C corresponds to the third step, and Step S5D corresponds to the fourth step.

Then, the processing proceeds to Step S5H, in which the insulating material is injected, as in Step S39 described above, into the concave portion CP formed in the current collector 11 and the first electrode mixture layer 12 by the pulse laser PL applying (concave portion formed by the removal of the portions to be removed 11A, 12A). Then, the processing proceeds to Step S5I, and it is determined whether or not the number of measurements n of the removal depth D (thickness) of the first electrode mixture layer 12 has reached "3". In other words, it is determined whether or not the removal depth D (thickness) of the first electrode mixture layer 12 has been measured at the three places of the first electrode mixture layer 12 (three portions to be removed 12A).

Once it is determined in Step S5I that the number of measurements n has yet to reach "3" (NO), the processing proceeds to Step S5J, the stage 8 is subjected to a parallel movement, and the opaque laminated body 10 is moved such that the white light WL and the pulse laser PL are applied to the region of the current collector 11 other than the region to which the pulse laser PL is applied already (the other portion to be removed 11A). Then, the processing returns to Step S52 and a series of the above-described processing (processing of Step S52 to S5I) is performed.

Once it is determined in Step S5I that the number of measurements n has reached "3" (YES), the processing proceeds to Step S5K and the integrated value of the number of applying pulses is reset. Subsequently, the processing proceeds to Step S5L, in which the white light source 2 is turned OFF and the white light WL applying is terminated.

Then, the processing proceeds to Step S5M, in which the data processing unit 4 calculates the average value of the removal depths D (thicknesses) measured at the three places of the current collector 11 and acquires this average value as the thickness T2 of the current collector 11. Then, the processing proceeds to Step S5N, in which the data processing unit 4 calculates the average value of the removal depths D (thicknesses) measured at the three places of the first electrode mixture layer 12 and acquires this average value as the thickness T3 of the first electrode mixture layer 12. Steps S58, S5G, S5M, and S5N of this Example 2 correspond to the fifth step.

Subsequently, the processing proceeds to Step S6 (refer to FIG. 7) and a thickness T4 of the solid electrolyte layer 13 is calculated. Specifically, the difference value (Tt−(T1+T2+T3)) that is obtained by subtracting the sum (=T1+T2+T3) of the thickness T1 of the second electrode mixture layer 14 calculated in Step S3E, the thickness T2 of the current collector 11 calculated in Step S5M, and the thickness T3 of the first electrode mixture layer 12 calculated in Step S5N from the total thickness Tt of the opaque laminated body 10 (laminated battery material) measured in Step S2 is calculated, and this difference value is acquired as the thickness T4 of the solid electrolyte layer 13. In this manner, the thickness of each of all the opaque layers that constitute the opaque laminated body 10 (laminated battery material) can be grasped.

In the opaque laminated body 10 that is the laminated battery material, the solid electrolyte layer 13 is interposed between the first electrode mixture layer 12 (negative electrode mixture layer) and the second electrode mixture layer 14 (positive electrode mixture layer) and this solid electrolyte layer 13 also functions as the insulating layer for electrical insulation between the first electrode mixture layer (negative electrode mixture layer) and the second electrode mixture layer (positive electrode mixture layer).

Accordingly, when the through-hole is made in the solid electrolyte layer 13 with the solid electrolyte layer 13 to which the pulse laser PL is applied for the measurement of the thickness of the solid electrolyte layer 13, the electrical insulation between the first electrode mixture layer 12 and the second electrode mixture layer 14 cannot be ensured in some cases. This laminated battery material (opaque laminated body 10) cannot be used for battery manufacturing (the internal short circuit might occur in the battery in a case where this laminated battery material is used), and thus is discarded after the measurement of the thickness of each opaque layer.

In contrast, by the measurement method according to this Example 2, the thicknesses T1 to T4 of all the opaque layers including the solid electrolyte layer 13 can be grasped with regard to the opaque laminated body 10 that is the laminated battery material with no through-hole attributable to the partial removal (ablation) of the solid electrolyte layer 13 resulting from the applying of the pulse laser PL being made in the solid electrolyte layer 13 as described above. Accordingly, the electrical insulation between the first electrode mixture layer 12 and the second electrode mixture layer 14 is ensured even after the measurement of the thicknesses T1 to T4 of the respective opaque layers and the opaque laminated body 10 can be used for the battery, without being discarded, as the laminated battery material. Accordingly, it can be said that the measurement method according to this Example 2 is an excellent measurement method as a method for measuring the layer thickness of a laminated battery material that is an opaque laminated body.

The opaque laminated body 10 has a size of 7 cm×20 cm in a plan view. Each of the holes (concave portions CP) that are formed in the current collector 11, the first electrode mixture layer 12, and the second electrode mixture layer 14 by the pulse laser PL applying has a diameter of, for example, approximately 100 μm. Accordingly, it can be said that a performance of the opaque laminated body 10 as the electric power generation element does not change even when the thicknesses T1 to T4 of the respective opaque layers are measured as described above. Hence, the opaque laminated body 10 can be appropriately used as the electric power generation element of the battery even after the measurement of the thicknesses T1 to T4 of the respective opaque layers.

The invention has been described with Examples 1 and 2 above. However, as a matter of course, the invention is not limited to these examples and can also be applied after being appropriately modified without departing from the spirit of the invention.

For example, in Example 2, the removal depths D (thicknesses) of the three places are measured (number of measurements n=3) for each of the current collector 11, the first electrode mixture layer 12, and the second electrode mixture layer 14 and the average values are acquired as the thicknesses of the respective layers. However, the number of measurements n (number of places at which the removal depth D is measured) may be any number. For example, the removal depth D of a single place may be determined as it is as the layer thickness with the number of measurements n at 1.

In Examples 1 and 2, the "number of applying pulses" is used as the "value corresponding (equivalent) to the number of applying pulses" of the pulse laser. In other words, the number of applying pulses of the pulse laser PL is integrated during a period of measurement and the layer thickness is calculated by the use of the previously-grasped "relational expression (linear expression) of the number of applying pulses N (number of times) and the removal depth D". However, the "integrated value of the applying time (pulse width)" or the "time elapsed since the initiation of the applying" may be used as the "value corresponding (equivalent) to the number of applying pulses" as well. For example, a correlation between the number of applying pulses and the integrated value of the applying time is grasped in advance and the integrated value of the applying time corresponding to the number of applying pulses of the pulse laser PL is calculated during the period of measurement by the use of this correlation. Then, the layer thickness may be calculated by the use of a previously-grasped "relational expression (linear expression) of the integrated value of the applying time and the removal depth". In a case where the pulse laser is emitted at a regular interval, the time elapsed since the initiation of the pulse laser PL applying may be measured during the period of measurement and the layer thickness may be calculated by the use of a previously-grasped "relational expression (linear expression) of the time elapsed since the initiation of the applying and the removal depth D".

In Example 2, the thickness of the second electrode mixture layer 14 is measured, then the opaque laminated body 10 is turned upside down and then the thicknesses of the current collector 11 and the first electrode mixture layer 12 are measured so that no through-hole (concave portion CP) is formed in the solid electrolyte layer 13. However, the invention is not limited to this measurement method. For example, the thicknesses of the respective layers may also be measured, by the use of the pulse laserapplying, in the order of the second electrode mixture layer 14, the solid electrolyte layer 13, and the first electrode mixture layer 12 (in the order of laminating from above). In a case where the opaque laminated body is not a battery material, this measurement in the order of laminating is particularly preferable because it allows measurement within a shorter period of time.

What is claimed is:

1. A layer thickness measurement method for measuring a thickness of an opaque layer in an opaque laminated body including a plurality of the opaque layers, the opaque laminated body including a first opaque layer and a second opaque layer different in color from the first opaque layer and the second opaque layer being laminated in contact with the first opaque layer, the measurement method comprising:
    applying white light to a portion of the first opaque layer to be removed across an entire thickness of the first opaque layer in a thickness direction of the first opaque layer from a side opposite to a side with which the second opaque layer is in contact as a first processing;
    applying pulse laser to the portion to be removed in the thickness direction of the first opaque layer from the side opposite to the side with which the second opaque layer is in contact for the portion to be removed from the first opaque layer to be removed and conducting integration of a value corresponding to the number of applying pulses of the pulse laser as a second processing;
    acquiring reflected light of the white light and performing a spectral analysis for the reflected light as a third processing;
    determining whether or not a white light applying target has changed from the first opaque layer to the second opaque layer based on a result of the spectral analysis as a fourth processing; and
    obtaining a removal depth of the first opaque layer corresponding to an integrated value from the integrated value of the value corresponding to the number of applying pulses integrated, based on a correlation between the value corresponding to the number of applying pulses of the pulse laser and the removal depth of the first opaque layer grasped in advance, once it is determined in the fourth processing that the white light applying target has changed from the first opaque layer to the second opaque layer, and acquiring the removal depth as the thickness of the first opaque layer as a fifth processing.

2. The measurement method according to claim 1, the opaque laminated body being an opaque laminated body in which n units of the opaque layers are laminated and the opaque layers adjacent to each other in a laminating direction having different colors, the measurement method further comprising:

a processing for measuring a total thickness of the opaque laminated body, wherein the first, second, third, fourth, and fifth processing are performed on the two opaque layers constituting each opaque layer set including the first opaque layer and the second opaque layer in each of the (n−1) set(s) of the opaque layer set(s), the opaque layer set being a combination of the two opaque layers adjacent to each other in the laminating direction in the opaque laminated body, such that the thickness of each of the (n−1) unit(s) of the opaque layer(s) regarded as the first opaque layer is acquired, and then a difference value is calculated by subtracting a sum of the acquired thicknesses of the (n−1) unit(s) of the opaque layer(s) from the measured total thickness of the opaque laminated body, and the difference value is acquired as the thickness of the remaining opaque layer, the thickness of the remaining opaque layer is not acquired during the first, second, third, fourth, and fifth processing.

3. The measurement method according to claim 1, wherein the opaque laminated body is a laminated battery material including a current collector that is the opaque layer, a first electrode mixture layer that is the opaque layer laminated on a surface of the current collector, a solid electrolyte layer that is the opaque layer laminated on a surface of the first electrode mixture layer, and a second electrode mixture layer that is the opaque layer laminated on a surface of the solid electrolyte layer, the current collector is different in color from the first electrode mixture layer, the first electrode mixture layer is different in color from the solid electrolyte layer, and the solid electrolyte layer is different in color from the second electrode mixture layer, the measurement method comprises the processing for measuring a total thickness of the opaque laminated body, a thickness of the second electrode mixture layer is acquired by the first, second, third, fourth, and fifth processing being performed on the second electrode mixture layer regarded as the first opaque layer and the solid electrolyte layer regarded as the second opaque layer, a thickness of the current collector is acquired by the first, second, third, fourth, and fifth processing being performed on the current collector regarded as the first opaque layer and the first electrode mixture layer regarded as the second opaque layer, a thickness of the first electrode mixture layer is acquired by the first, second, third, fourth, and fifth processing being performed on the first electrode mixture layer regarded as the first opaque layer and the solid electrolyte layer regarded as the second opaque layer, and then a difference value is calculated by subtracting a sum of the acquired thickness of the second electrode mixture layer, the acquired thickness of the current collector, and the acquired thickness of the first electrode mixture layer from the measured total thickness of the opaque laminated body, and the difference value is acquired as the thickness of the solid electrolyte layer.

4. The measurement method according to claim 3, wherein the thickness of the second electrode mixture layer is measured, then the opaque laminated body is turned upside down and then the thicknesses of the current collector and the first electrode mixture layer are measured.

5. The measurement method according to claim 1, wherein the number of applying pulses of the pulse laser is integrated during a period of measurement, and the layer thickness is calculated by a relation expression of the number of applying pulses and the removal depth grasped in advance.

6. The measurement method according to claim 1, wherein an integrated value of applying time corresponding to the number of applying pulses of the pulse laser is calculated during a period of measurement, and the layer thickness is calculated by a relation expression of the integrated value of the applying time and the removal depth grasped in advance.

7. The measurement method according to claim 1, wherein time elapsed since initiation of applying of the pulse laser is measured during a period of measurement, and the layer thickness is calculated by a relation expression of the time elapsed since the initiation of the applying and the removal depth grasped in advance.

* * * * *